United States Patent
Iso et al.

(10) Patent No.: US 7,995,431 B2
(45) Date of Patent: Aug. 9, 2011

(54) OPTICAL DISC DEVICE

(75) Inventors: Yoshimi Iso, Tokyo (JP); Mitsuo Hagiwara, Tokyo (JP); Mitsuyuki Kimura, Tokyo (JP)

(73) Assignee: Renesas Electronics Corporation, Kanagawa (JP)

( * ) Notice: Subject to any disclaimer, the term of this patent is extended or adjusted under 35 U.S.C. 154(b) by 464 days.

(21) Appl. No.: 11/915,261

(22) PCT Filed: May 23, 2005

(86) PCT No.: PCT/JP2005/009330
§ 371 (c)(1),
(2), (4) Date: Mar. 2, 2009

(87) PCT Pub. No.: WO2006/126242
PCT Pub. Date: Nov. 30, 2006

(65) Prior Publication Data
US 2009/0213705 A1    Aug. 27, 2009

(51) Int. Cl.
*G11B 7/00* (2006.01)
(52) U.S. Cl. ............ 369/44.35; 369/44.27; 369/44.29
(58) Field of Classification Search ........... 369/44.35
See application file for complete search history.

(56) References Cited

U.S. PATENT DOCUMENTS

| 6,157,600 A | 12/2000 | Nakamura et al. |
| 2002/0191517 A1 | 12/2002 | Honda et al. |
| 2004/0004912 A1 | 1/2004 | Morishima |
| 2004/0136291 A1 * | 7/2004 | Hayashi .................. 369/53.2 |
| 2005/0265208 A1 * | 12/2005 | Nakane et al. ............ 369/272.1 |
| 2006/0126453 A1 * | 6/2006 | Lipinski et al. ........... 369/44.11 |
| 2006/0144941 A1 * | 7/2006 | Pratt .......................... 235/432 |

FOREIGN PATENT DOCUMENTS

| EP | 0986053 | 3/2000 |
| EP | 1517314 | 3/2005 |
| JP | 58-155527 | 9/1983 |
| JP | 58-212631 | 12/1983 |
| JP | 9-16981 | 1/1997 |
| JP | 2003-242669 | 8/2003 |
| JP | 2004-213796 | 7/2004 |
| JP | 2005-93050 | 4/2005 |

* cited by examiner

*Primary Examiner* — Lixi C Simpson
(74) *Attorney, Agent, or Firm* — Mattingly & Malur, PC

(57) ABSTRACT

The optical disc device has a circuit 4 which forms a focus error signal FER for focus servo control based on reflection light from an optical disc exposed to laser light. A data processing unit 2 can control by feedback a position to which an objective lens is moved by a focusing actuator 30 based on the focus error signal. In label printing, the data processing unit controls, by feedforward, a position to which the objective lens is moved by the focusing actuator based on control data for label printing. The operation resolution of the focusing actuator in feedforward control is made higher than that in feedback control. Thus, an intended position control accuracy is achieved in feedforward control. For instance, in feedforward control, the gain of the driver circuit 40 for the focusing actuator is switched to a smaller one in comparison to that in feedback control.

6 Claims, 8 Drawing Sheets

OPTICAL DISC DEVICE

TECHNICAL FIELD

The present invention relates to an optical disc device capable of printing e.g. a title and a photograph on a label face of an optical disc coated with a paint sensitive to laser light or the like.

BACKGROUND ART

The patent documents JP-A-58-155527 and JP-A-58-212631 contain the description about a focus servo for focusing laser light on a signal face of a disc such as CD-ROM for the purpose of reading data from the signal face. For instance, based on a focus error signal obtained from an output of a photo detector which detects reflection light from a disc using four quadrantal detector elements, a feedback loop is utilized to move up and down an objective lens of an optical pickup while keeping constant the distance between the objective lens and the disc whose surface is wobbling with rotation owing to a warp of the disc, whereby the laser light is focused on the signal face.

DISCLOSURE OF THE INVENTION

Problems that the Invention is to Solve

A laser label printing method including coating a label face of an optical disc with a laser-sensitive paint, and irradiating the disc face with laser light for optical recording to record a title, a picture and a photograph has been proposed. Also, in the laser label printing, it is necessary to force laser light to focus on a coating face. However, even when the focus servo control as described above is applied as it is, things do not go well. This is considered to be attributed to a low reflectance and poor smoothness of a laser label print face. The low reflectance is further changed by reentrants and protrusions of the surface. Therefore, even when a larger laser power is supplied, a large noise component is still superposed on a resultant reflection signal, and therefore it is impossible to utilize a focus error signal as a feedback control signal. Hence, the inventor examined, as means for focusing laser light on a laser label print face, execution of feedforward control, including: measuring a surface wobbling from a certain rotation position of a disc; storing a resulting measurement in a memory; and transmitting it to a focusing actuator, thereby to have the laser light focused.

The feedforward control requires actual measurements of the surface wobbling of an optical disc. For instance, one circumference of a disc is divided into 64 divisions, and the focusing actuator is actuated up and down little by little in the respective places. Then, the control data of the focusing actuator when the reflection light from the laser label print face reaches a maximum are stored in the memory. Repeating this process e.g. 64 times makes possible to obtain the control data for feedforward control in connection with a circumference of the disc. For one disc, it is required to measure data corresponding to 60 circumferences e.g. at intervals of 0.5 millimeters from the inside track circumference to the outside track circumference of the disc. The following are judged: how many millimeters the target position is away from the innermost track circumference of the disc in a radial direction; and where is the target position located in the 64 divisions, from the disc-start position in a circumferential direction of the disc. The laser light can be focused by using the data corresponding to the results of the judgments.

However, it became clear that when the same digital-to-analog conversion circuit and driver circuit are used in feedback control and feedforward control to drive the focusing actuator, a good print quality cannot be obtained in laser label printing. According to the result of examination by the inventor, first the accuracy required for controlling the position of the objective lens with respect to the location of a focal point on the optical disc with a surface wobbling must be attained because surface wobbling of the optical disc is permitted. On this occasion, it is revealed that at worst ±30 micrometers should be materialized as the control accuracy of the position of the objective lens with respect to the position of the focal point on the optical disc in order to obtain a good print quality without blurring and feathering and bleeding in laser label printing. Second, it becomes necessary to achieve e.g. ±1 micrometer as the control accuracy of the position of the objective lens with respect to the position of the focal point on the optical disc in recording and reproducing digital information when the surface wobbling allowed to the optical disc is about 1 millimeter. As for the feedback control system, to attain the position control accuracy, the conversion bit number of the digital-to-analog conversion circuit and the gain of the driver circuit are decided so that a necessary loop gain can be achieved. Therefore, even when the digital-to-analog conversion circuit and driver circuit of the feedback control system dedicated to use for recording and reproducing digital information are used for feedforward control as they are, it is impossible to obtain a position control accuracy of ±30 micrometers. In view of the nature of feedforward control, the degree of surface wobbling varies from position to position. Therefore, it is necessary to prepare data for feedforward control for each position where the actuator is driven. Hence, considering that the accumulation of errors directly influences the control accuracy, it was clearly shown that the operation resolution (the quantity of movement per LSB of the digital-to-analog conversion circuit) of the focusing actuator in the feedback control is insufficient for feedforward control.

The inventor further examined the balance with the quantity of data for feedforward control. Specifically, it takes an enormous length of learning time to acquire control data of the focusing actuator with respect to all laser irradiation positions shifted in the circumferential direction and radial direction of an optical disc for label printing. Moreover, if the number of bits of control data used for feedforward control is just made larger to increase the operation resolution of the focusing actuator in feedforward control, the processing time necessary for digital-to-analog conversion as well as acquisition of control data through learning will be made longer.

Therefore, it is an object of the invention to provide an optical disc device which can improve the quality of laser label printing readily.

Also, it is another object of the invention to provide an optical disc device which can realize improvement of the quality of laser label printing and shortening of the print-processing time readily.

The above and other objects of the invention and novel features hereof will be apparent from the descriptions hereof and the accompanying drawings.

Means for Solving the Problems

Of the optical disc devices disclosed therein, the representative ones will be described below in brief outline.

[1] The optical disc device can record and reproduce information by irradiating one face of an optical disc with laser light through an objective lens and perform label printing by irradiating the other face of the disc with the laser light through the objective lens. This optical disc device has a circuit (4) for forming a focus error signal (FER) for a focus servo based on a reflection light from the optical disc exposed to the laser light. Further, the optical disc device has a data processing unit (2) which can feedback-control a position to which the objective lens is moved by a focusing actuator (30), based on the focus error signal. When performing the label printing, the data processing unit feedforward-controls a position to which the objective lens is moved by the focusing actuator based on control data for the label printing. The operation resolution of the focusing actuator in the feedforward control is made higher than that in the feedback control. In the feedback control, the control accuracy of the position of the objective lens with respect to the position of a focal point on the optical disc is ±1 micrometer or smaller. In the feedforward control, the control accuracy of the position of the objective lens with respect to the position of the focal point on the optical disc is between ±10 and ±30 micrometers. Here, "the control accuracy of the position is ±10 micrometers" means that in control of the position, the error of the position with respect to an ideal position falls between −10 and +10 micrometers inclusive.

For an optical disc, surface wobbling is allowed. Therefore, the accuracy required for control of the position of an objective lens with respect to the position of a focal point on an optical disc with its surface wobbling must be achieved. In this case, if at the worst ±30 micrometers is materialized as the control accuracy of the position of the objective lens with respect to the position of a focal point on an optical disc, a good print quality without blurring, feathering and bleeding can be achieved in laser label printing. When surface wobbling of about 1 millimeters is allowed for an optical disc, the control accuracy of the position of the objective lens with respect to the position of a focal point on the optical disc in recording and reproducing digital information is made e.g. ±1 micrometer or smaller. However, even if the conversion bit number of the digital-to-analog conversion circuit and the gain of a driver circuit, which are required for the feedback control system to achieve this position control accuracy, are used for feedforward control as they are, it is impossible to attain a position control accuracy of ±30 micrometers. The intended position control accuracy in the feedforward control can be obtained by making higher the operation resolution of the focusing actuator in the feedforward control than that in the feedback control.

A specific means for making the operation resolution of the focusing actuator in the feedforward control higher than that in the feedback control is as follows. When performing the feedforward control, the data processing unit switches the gain of a driver circuit (40) of the focusing actuator so as to become smaller than the gain in the feedback control.

Another specific means for making the operation resolution of the focusing actuator in the feedforward control higher than that in the feedback control is as follows. When performing the feedforward control, the data processing unit uses an audio analog-to-digital conversion circuit (50) to convert the control data for label printing into analog signals instead of the analog-to-digital conversion circuit (17) for servo control to convert the servo control data into analog signals. The conversion bit number of the audio analog-to-digital conversion circuit is larger than that of the analog-to-digital conversion circuit for servo control.

[2] The arrangements as described below may be adopted as specific means for switching the gain of the driver circuit. The data processing unit has an analog-to-digital conversion circuit (18) which converts the focus error signal into digital data, and a servo control circuit (14) which an output of the analog-to-digital conversion circuit is input to and which produces servo control data. Further, the data processing unit has a digital-to-analog conversion circuit (17) which converts the servo control data output by the servo control circuit or the control data for label printing into analog signals. Moreover, the optical disc device has a driver circuit (40) which amplifies an output of the digital-to-analog conversion circuit and supplies the resultant signals to the focusing actuator. In the optical disc device, the driver circuit is arranged so that its gain can be switched. The gain is switched and controlled so that the gain used in the feedforward control becomes smaller than the gain used in the feedback control.

The driver circuit is arranged so that its voltage gain can be switched. As the focusing actuator has a low impedance, the current gain rather than the voltage gain is required. In such case, if the voltage gain is made switchable, the simpler circuit arrangement can be obtained. For instance, it is enough to just make switchable the feedback resistance of the operational amplifier.

[3] The arrangements as described below may be adopted as specific means for making possible the switching between the analog-to-digital conversion circuits different in conversion bit number. The data processing unit has an analog-to-digital conversion circuit (18) which converts the focus error signal into digital data, and a servo control circuit (14) which an output of the analog-to-digital conversion circuit is input to, and which produces servo control data. Further, the data processing unit has a digital-to-analog conversion circuit (17) for servo control which converts servo control data output by the servo control circuit into analog signals, and a digital signal processing circuit (13) which reproduces record information readout from an optical disc. In addition, the data processing unit has an audio digital-to-analog conversion circuit (50) which converts audio information reproduced by the digital signal processing circuit or the control data for label printing into analog signals. In addition, the optical disc device has a focusing driver circuit (40A) which amplifies an output from the digital-to-analog conversion circuit for servo control or an output from the audio digital-to-analog conversion circuit, and supplies the resultant to the focusing actuator. Also, the optical disc device has an audio driver circuit (51) which amplifies an output from the audio digital-to-analog conversion circuit and outputs the resultant outside. When the feedback control is used to control a position to which the objective lens is moved by the focusing actuator, an input of the focusing driver circuit is connected with an output of the digital-to-analog conversion circuit for servo control. When the feedforward control is used to control the position, the input of the focusing driver circuit is connected with an output of the audio digital-to-analog conversion circuit, and the control data for label printing is supplied to an input of the audio digital-to-analog conversion circuit.

[4] In regard to shortening of the learning time for feedforward control, the following arrangement can be adopted. The data processing unit performs a learning process which includes previously acquiring and storing, in a memory, the control data for label printing for determining a position of the objective lens in a focal point direction so that a quantity of reflection light reflected off the other face of the optical disc becomes maximum while moving a laser irradiation position in circumferential and radial directions of the optical disc, and uses the control data read out from the memory in the feedforward control.

The learning process is a process that the control data concerning track circumferences discontinuous and different in position in the radial direction of the optical disc are acquired and stored in the memory. When there are not the control data for label printing corresponding to label print positions in circumferential and radial directions of the optical disc, two pieces of control data for label printing concerning another position are read out from the memory, and control data for label printing acquired by an interpolation operation using the control data for label printing thus read out are used for the feedforward control.

As one specific form of the invention, the track circumferences discontinuous and different in position in the radial direction may be e.g. three track circumferences composed of an innermost track circumference, a middle track circumference and an outermost track circumference.

Considering the case where control data for the focusing actuator are acquired for each turn, by moving the laser irradiation position in the radial direction of an optical disc e.g. at intervals of 30 micrometers, it is required for a typical optical disc with a diameter of 12 centimeters to acquire data over about 1000 turns while moving over a distance of about 30 millimeters (the distance between print tracks is 30 micrometers). According to the learning process, when control data are acquired at e.g. a position on the innermost track circumference, a position on the middle track circumference, which is spaced away from the innermost track circumference in the radial direction by 15 millimeters, a position on the outermost track circumference, which is spaced away from the middle track circumference in the radial direction by 15 millimeters, control data corresponding to three circumferences can be obtained. Thus, the time for data acquisition can be reduced largely. In the feedforward processing, e.g. the i-th control data Ci from a disc-start position on the 200th print track from the innermost track circumference can be calculated readily from i-th control data A from the disc-start position of the innermost track circumference, and the i-th control data B from the disc-start position of the middle track circumference by the following expression:

$$Ci = A + 200*(Bi - Ai)/500.$$

The calculation like this can be completed in the twinkle of an eye when it is performed by a data processing unit such as a typical microcomputer, and never affects the time for recording. The same calculation method is used in the case where in laser label printing, the unit of movement of the laser irradiation position in the radial direction of an optical disc is set to the half, i.e. 15 micrometers. However, it is also necessary to interpolate control data for circumferential directions of the innermost track circumference, middle track circumference and outermost track circumference. The unit of movement of the laser irradiation position may be changed selectively later according to a required print accuracy.

Effects of the Invention

The effects achieved by representative one of the optical disc devices disclosed herein are as follows in brief.

The quality of laser label printing can be improved readily.

Improvement of the quality of laser label printing and shortening of the print-processing time can be achieved readily.

EXPLANATION OF REFERENCE NUMERALS

1: Optical Disc Device
2: Microcomputer (SMCU)
3: SDRAM
4: Analog Front-end (AFE) 4
5: Optical Pickup (OPU)
6: Thread Motor (TM)
7: Disc Motor (DM)
8: Motor Driver (MDRV)
9: Label-print Position Detector
10: Optical Disc
11: Slot
12: Processor Core (MPU)
13: Digital Signal Processing Unit (DSP)
14: Servo Control Unit (SRV)
15: SRAM
16: ROM
17: DAC
18: ADC
19: Input-output Circuit for External Interface (I/O)
20: Low-pass Filter
22: Main Spot
23: Detector
23A, 23B, 23C, 23D: Photodiode
FER: Focus Error Signal
26: Subtracter Circuit
27: Adder Circuit
30: Focusing Actuator 31: Objective Lens
40: Driver Circuit having Gain-switching Function
40A: Driver Circuit with Fixed Gain
41: Switch
46: Gain-switching Control Signal
50: DAC used for both Audio and Label Printing
51: Driver Circuit for Audio
DATa: Control Data for Innermost Track circumference
DATb: Control Data for Middle Track circumference
DATc: Control Data for Outermost Track circumference

BEST MODE FOR CARRYING OUT THE INVENTION

Outline of Optical Disc Device

Figure 2:
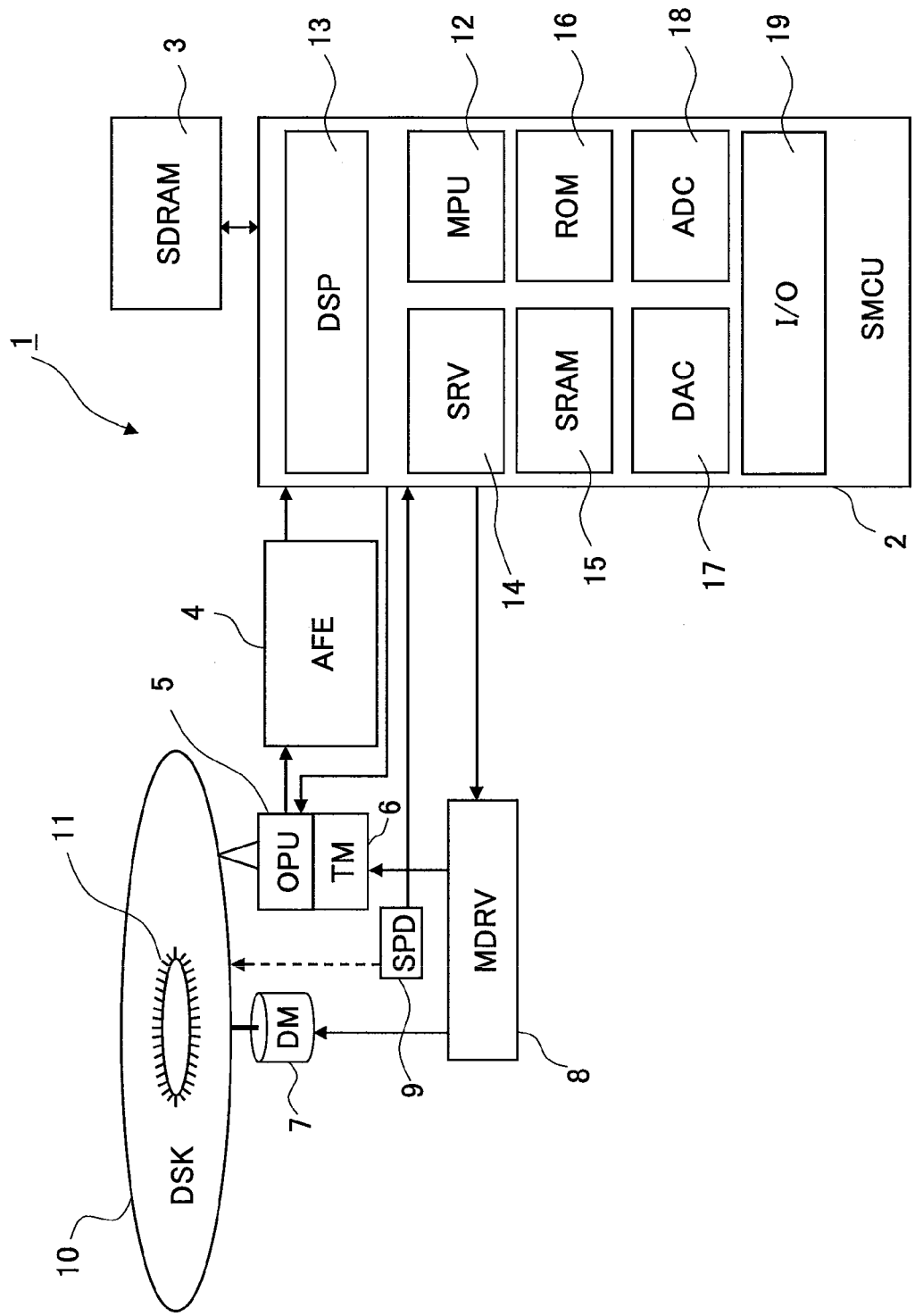
FIG. 2 is a block diagram showing an example of the optical disc device.

FIG. 2 shows an example of the optical disc device. The optical disc device shown in the drawing is arranged so that it can record and reproduce information on and from one face of an optical disc, and print a label on the other face when using laser light. In the drawing, the optical disc device 1 includes: a single-chip microcomputer (SMCU) 2; an SDRAM 3; an analog front-end (AFE) 4; an optical pickup (OPU) 5; a thread motor (TM) 6; a disc motor (DM) 7; a motor driver (MDRV) 8; and a label-print position detector (SPD) 9. The optical discs which allow recording and reproducing by the optical disc device may include one or more kinds of CD-ROM, DVD, DVD-RW, DVD-RAM and the like. Depending on what is targeted for processing by the device, the frequency of the laser light, the rate of data processing, the property of the filter, etc. will be varied.

On the front surface of the optical disc 10, an information track is formed e.g. spirally, and digital data modulated according to e.g. EFM (Eight-to-Fourteen Modulation) are recorded reproduceably. The rear surface of the optical disc 10 is coated with a laser light-sensitive paint, on which a label can be printed by laser light. Many slots 11 used for controlling the position in the circumferential direction of an optical disc 10 when a label is printed by laser light are formed along the innermost track circumferential portion of the disc. One of the slots 11 indicates the start position.

The disc motor 7 is driven by the motor driver 8 and drives and rotates an optical disc 10. The information recorded on the optical disc 10 is read out using the pickup 5 moved in the radial direction of the optical disc 10. The pickup 5 is arranged so that it launches laser light from a semiconductor laser against the optical disc 10 through an objective lens, etc, and uses a detector composed of a photodiode to receive the resultant reflection light, and then conducts photoelectric conversion thereof. The pickup 5 includes: a focusing actuator which moves the objective lens back and forth with respect to the focal point thereof in order to bring the focal point of the objective lens into agreement with an information-recording surface of the optical disc; and a tracking actuator for actuating the objective lens along each track. As the range within which the tracking actuator can actuate the objective lens is finite, the thread motor 6 is provided in order to move the whole pickup 5 in the radial direction of the disc 10.

An information signal read out from the pickup 5 is supplied to the analog front-end 4. The analog front-end 4 amplifies an input signal and shapes the waveform thereof, and then outputs a radio frequency signal containing a readout signal component, a focus error signal, a tracking error signal, etc.

The radio frequency signal, focus error signal, tracking error signal, etc. are supplied to the microcomputer 2. The microcomputer 2 includes: a processor core (MPU) 12; a digital signal processing unit (DSP) 13; a servo control unit (SRV) 14; a static random access memory (SRAM) 15; a read only memory (ROM) 16; a digital-to-analog conversion circuit (DAC) 17 for converting a digital signal into an analog signal; an analog-to-digital conversion circuit (ADC) 18 for converting an analog signal into a digital signal; and an input-output circuit (I/O) 19 for external interface. The processor core 12 includes a central processing unit (CPU) which fetches and executes an instruction, and an interrupt controller. The DSP 13 performs filtering of a radio frequency signal, and demodulation an extracted signal component and the like. The tracking error signal has an amplitude depending on a deviation from a track. The focus error signal has an amplitude depending on a deviation from the location of a focal point. The servo control unit 14 performs focusing servo control and tracking servo control based on the focus error signal and tracking error signal for offsetting the deviations. The focusing servo control is the operation of controlling the objective lens so that an information-recording surface of an optical disc, where surface wobbling is allowed, is located within the depth of focus of laser light. The tracking servo control is the control in connection with the eccentricity of the disc that the pick up is made to trace along an information-recording track. This makes possible to move the pickup following the information track even with a disc having an eccentricity or a wobbling surface. The SRAM 15 is utilized as a work region for the MPU 12. The ROM 16 holds an operation program for the MPU 12. The ADC 18 converts an analog signal output by the AFE 4 into a digital signal. The DAC 17 converts digital data output by the MPU 12 and SRV 14 into analog signals and supplies the resultant signals to the pickup 5 and motor driver 8.

Figure 3:
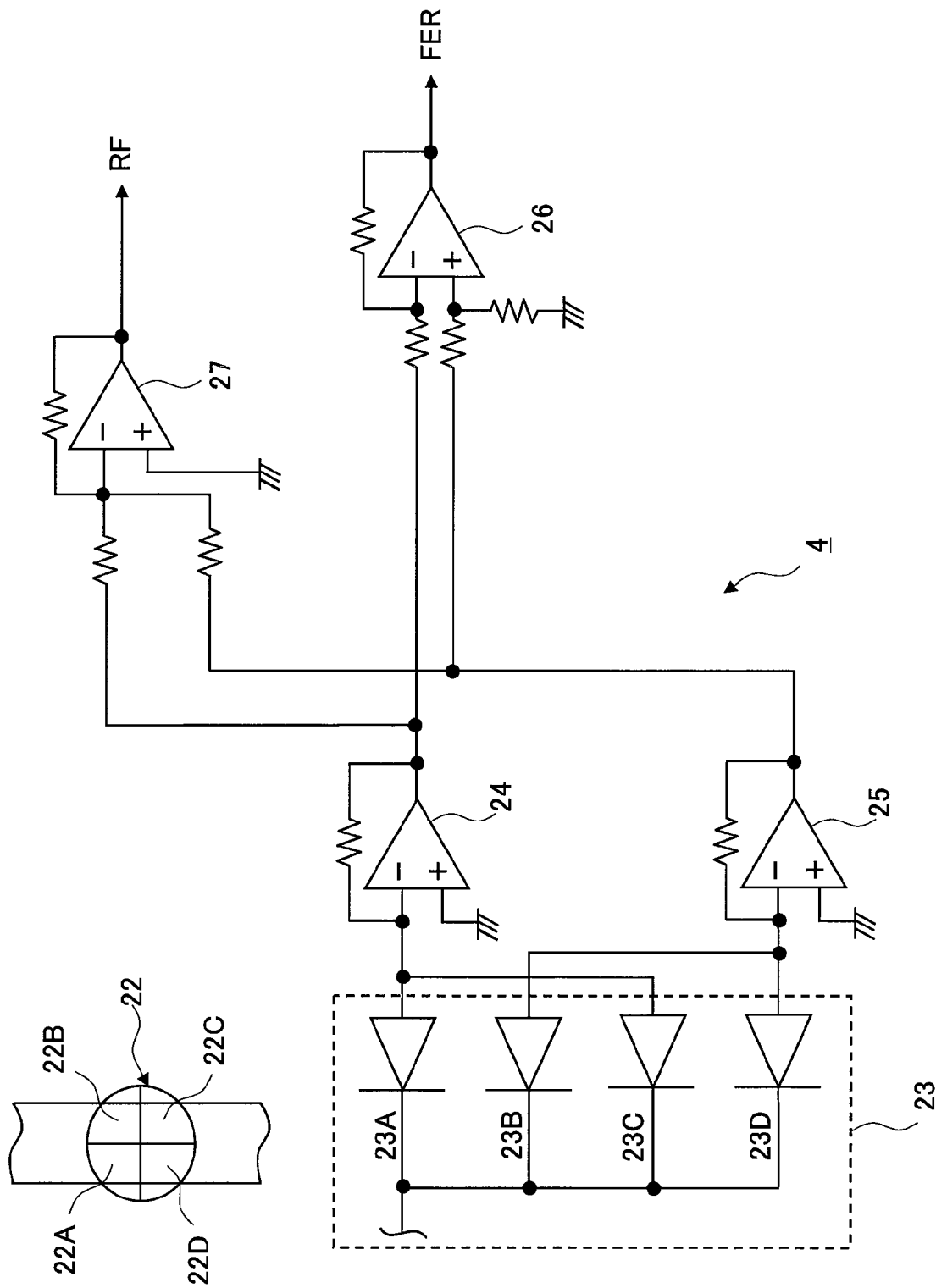
FIG. 3 is a circuit diagram exemplifying, as a specific example of the analog front-end, a circuit portion which produces a radio frequency signal RF and a focusing error signal FER.
Figure 4:
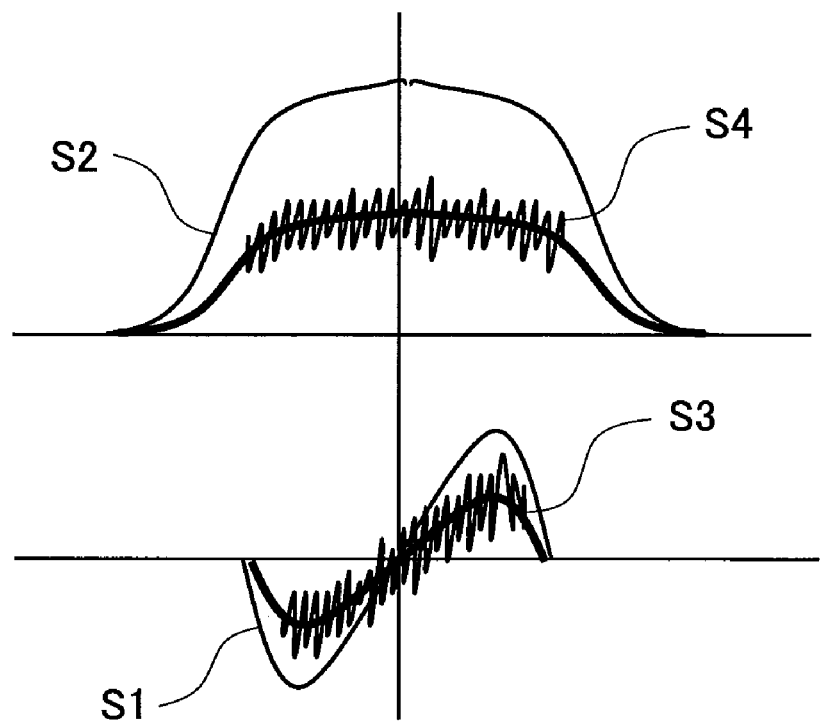
FIG. 4 is a waveform illustration showing waveforms of a focus error signal FER and an envelope signal EVP obtained in focus servo control with respect to an information-recording track, and waveforms of the focus error signal FER and the signal EVP obtained in feedforward focus control with respect to a label-print face.

Referring to FIG. 3, a circuit portion which produces a radio frequency signal RF and a focusing error signal FER is exemplified as a specific example of the analog front-end 4. The pickup 5 has a detector 23 which receives reflection light reflected off the surface of a disc 10 by a region of a main spot 22. The detector 23 has photodiodes 23A, 23B, 23C and 23D corresponding to quarter portions 22A, 22B, 22C and 22D of the main spot 22 respectively. The currents from the two photodiodes 23A and 23C arranged in point symmetry are added together, and the resultant current is converted into a voltage by the current-voltage conversion circuit 24. Likewise, the currents from the two photodiodes 23B and 23D arranged in point symmetry are added together, and the resultant current is converted into a voltage by the current-voltage conversion circuit 25. The voltages resulting from the conversions undergo the subtraction by the subtraction circuit 26, and the result makes a focus error signal FER. When the objective lens of the pickup 5 is fit for the depth of focus, the main spot 22 makes a circular form, which is concentrated on the photodiodes 23A to 23D uniformly under the action of the optical system. When the objective lens is too near, the main spot 22 takes an elliptical form gathered leaning to the photodiodes 23A and 23C under the action of the optical system. In contrast, when the objective lens is too far, the main spot takes an elliptical form gathered leaning to the photodiodes 23B and 23D under the action of the optical system. Therefore, when the objective lens is fit for the depth of focus, the output of the subtraction circuit 26 is made "0". The focus error signal FER takes a signal waveform as exemplified by S1 in FIG. 4. The servo control unit 14 actuates the focusing actuator to make the focus error signal FER zero, and controls the position of the objective lens on the pickup 5. The output voltage of the conversion circuit 24 and the output voltage of the conversion circuit 25 are added together by the adder circuit 27, forming an addition signal RF as a radio frequency signal. The addition signal RF is an EFM-modulation signal, for example. The envelope waveform thereof reaches a local maximum just at a focus point, and a local minimum at the center between tracks as exemplified by the waveform S2 in FIG. 4.

Control System of Focusing Actuator

Figure 1:
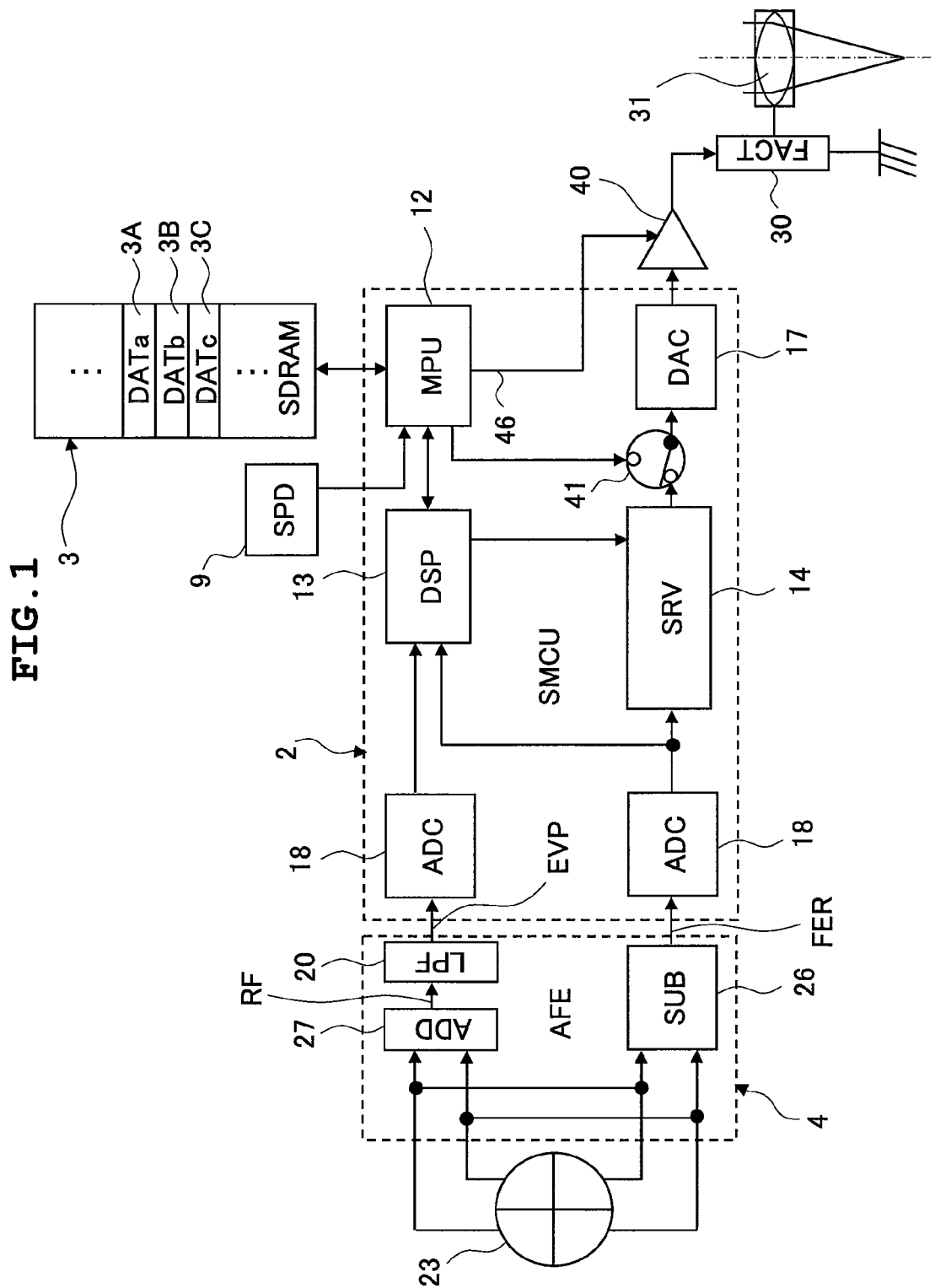
FIG. 1 is a block diagram exemplifying an example of a control system of the focusing actuator in detail.

Referring now to FIG. 1, the control system of the focusing actuator 30 will be described in detail. In reading/writing record information from/on an information-recording track of an optical disc, the focusing actuator 30 is driven under the feedback control according to servo control. The focus error signal FER output from the subtraction circuit (SUB) 26 is converted into a digital one by the ADC 18. The resultant digital data are passed through the DSP 13 and then used for servo-draw control by the MPU 12. The MPU 12 produces servo control data so that the focus error signal FER is made zero, passes the control data to the servo control unit 14 through the DSP 13, and then turns on the servo loop. After that, the servo control unit 14 produces focus servo control data so that the focus error signal FER is made zero. The focus servo control data are converted into analog signals by the DAC 17, and the resultant analog signals are amplified by the driver circuit 40. The focusing actuator (FACT) 30 is actuated according to the output signal of the driver circuit 40, and the position of the objective lens 31 is controlled back and forth in the focal point direction on the pickup 5. Thus, when an optical disc, whose surface wobbling is allowed, is driven and rotated, the position of the objective lens 31 according to the focusing actuator 30 in the focal point direction can be feedback-controlled so that the focus error signal is made zero. In this state, record information is read out from or written on an information-recording track of the optical disc 10. For instance, when record information is read out, the envelop of the radio frequency signal RF output from the adder circuit (ADD) 27 is detected by the low-pass filter (LPF) 20, and the envelope signal EVP is converted to a digital form by the ADC 18. The resultant digital data is supplied to the DSP 13 and demodulated under the control of the MPU 12.

The focusing actuator 30 is driven according to feedforward control in printing a label on a laser-label face of an optical disc. In the case of printing a label, the control data DATa, DATb and DATc for label printing are acquired through learning and put in the SDRAM 3 previously. After that, the input switch 41 of the DAC 17 is changed to the side of the MPU 12. According to the label-printing position, the MPU 12 produces control data for label printing based on the control data DATa, DATb and DATc for label printing, and supplies the resultant control data to the DAC 17. The analog signal resulting from conversion by DAC 17 is amplified by the driver circuit 40. The focusing actuator 30 is driven according to the output of the driver circuit 40.

Both in the feedback control and feedforward control, the DAC 17 and driver circuit 40 are used commonly. However, the control form is basically different between feedback and feedforward, and the focusing accuracy to be achieved varies between them. In this respect, in both the controls, the operation resolution of the focusing actuator can be selected by switching the gain of the driver circuit 40. The feedforward control for laser label printing will be described below in detail.

The label-print face of the optical disc 10 is poor in smoothness, and the reflectance of laser varies largely from hour to hour according to the fine asperities. Therefore, with the reflection light reflected off the label-print face exposed to laser light, information on the asperities is superposed on the waveform of an output signal EVP of the low-pass filter 20 as shown by the waveform S4 in FIG. 4. Likewise, the information on the asperities is superposed on the focus error signal FER offered by the subtraction circuit 26 as shown by the waveform S3 in FIG. 4. With the levels of the signal waveforms S3 and S4, as the reflectance of the label-print face is low in general, the signal waveforms S3 and S4 are smaller in signal level than the signal waveforms S1 and S2 on the whole.

When label printing is performed while shifting the laser irradiation position in the circumferential and radial directions of the optical disc 10, the microcomputer 2 learns about the condition of surface wobbling of the optical disc in advance. Specifically, the microcomputer 2 acquires control data for deciding the position of the focal point of the objective lens so that the quantity of reflection light coming from another face of the optical disc, which the aforementioned optical detector receives, becomes maximum, and stores the acquired data in the SDRAM 3. For instance, one circumference from the disc-rotation position detected by the position detector 9 for detecting the rotation-start position of the disc 10 is divided into e.g. 800. In this case, the MPU 12 outputs control data for the respective positions and moves the focusing actuator 30 up and down step by step through the DAC 17. Signals EVP for the respective positions of the objective lens 31, which the optical detector 23 has detected, are converted into digital form by the ADC 18, and the control data when the signals EVP have reached their maximums are stored in the SDRAM 3.

Figure 5:
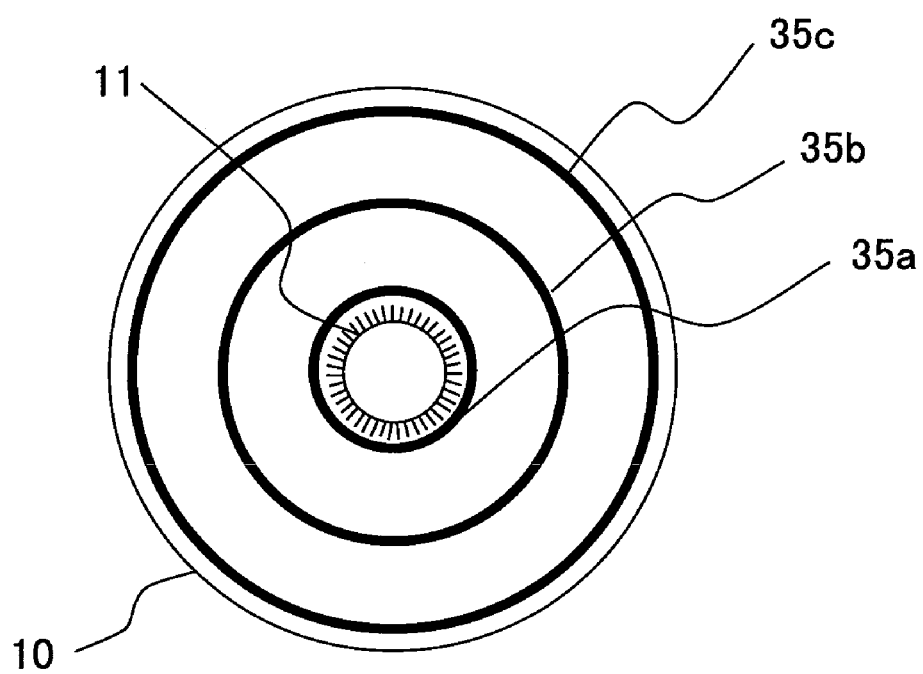
FIG. 5 is an explanatory drawing showing an innermost track circumferential portion 35a in a label-print face of an optical disc corresponding to control data DATa for an innermost track circumference, a middle track circumferential portion 35b in the label-print face of the optical disc corresponding to control data DATb for a middle track circumference, and an outermost track circumferential portion 35c in the label-print face of the optical disc corresponding to control data DATc for an outermost track circumference.
Figure 6:
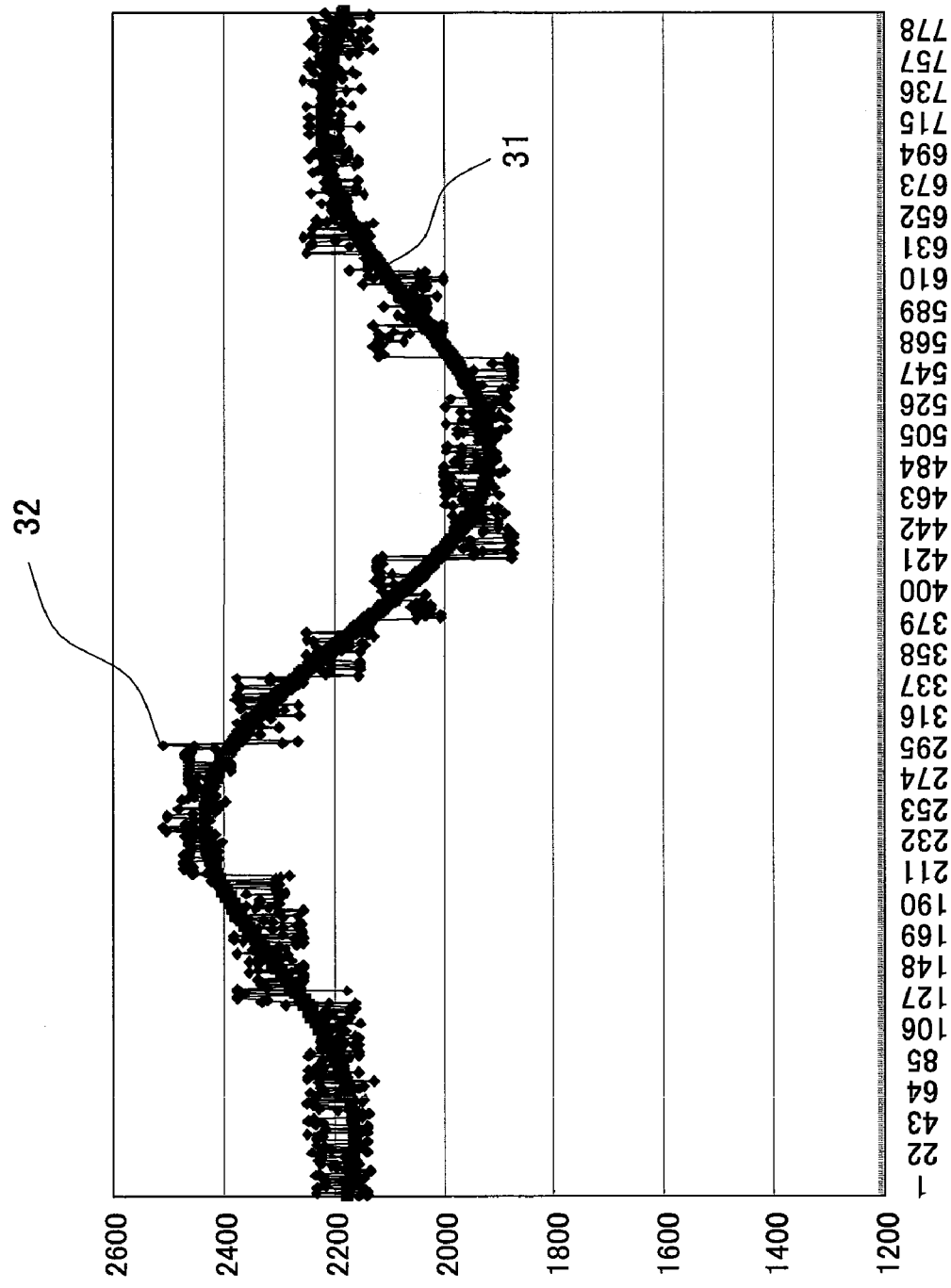
FIG. 6 is an explanatory drawing exemplifying values of control data to the DAC 17 when signals EVP resulting from division of one circumference into 800 are maximum, and values of control data smoothed by an operation of the least squares method.

At this time, the control data are acquired not for all track circumferences, but for some of them, e.g. the innermost track circumference, middle track circumference and outermost track circumference. For instance, a start signal is detected from slots 11 finely engraved in an inside track circumference of an optical disc 10 to identify the position in the circumferential direction, and then the start position information is output to the microcomputer 2. In the case where one track circumference has 800 slots, for example, the control data to the DAC 17 when the signal EVP reaches the maximum are recorded for each slot starting from the start position. On the other hand, as for the radial direction, the whole pickup 5 can be moved by the thread motor 6. When the pickup 5 is moved to the innermost track circumference, the limit switch is activated to stop a thread feeding operation. Therefore, the pickup 5 can be moved to the innermost track circumference. It is common to use a stepping motor as the thread motor 6, which is designed so that x steps (x pulses) move the pickup by y micrometers. Hence, the optical pickup 5 can be moved readily and precisely by sending the thread motor 6 pulses, the number of which depends on the desired distance for forwarding the pickup, as forwarding of the pickup 5 by a certain number of steps from the position of activation of the limit switch can move the pickup to the label-print start position of the track, and additional two pulses can move the pickup by 30 micrometers. The control data in connection with the innermost track circumference record position is acquired first, and then a total of 800 pieces of control data to the DAC 17 when the signal EVP reaches the maximum in the position of each slot on the track circumference can be obtained. As to these control data, smooth continuity (smoothness) with their values is ensured by an operation of the least squares method, and the control data DATa for the innermost track circumference are stored in the first region 3A of the SDRAM 3. Next, the optical pickup 5 is moved by e.g. 15 mm from the innermost track circumference in the direction toward the periphery of the disc. Then, on a track circumference in the destination position, 800 pieces of control data are acquired from the start position thereof in the same way. The control data thus acquired are stored in the second region 3B of the SDRAM 3 as control data DATb for the middle track circumference. Further, the optical pickup is moved by 15 mm from this place in the direction toward the periphery, and then 800 pieces of control data are acquired in the same way on the track circumference in the position of the destination. The control data thus acquired are stored in the third region 3C of the SDRAM 3 as control data DATc for the outermost track circumference. As shown in FIG. 5, the control data DATa for the innermost track circumference are handled as surface wobbling data of the innermost track circumferential portion 35$a$ in the label-print face of the optical disc 10. The control data DATb for the middle track circumference are treated as surface wobbling data of a middle track circumferential portion 35$b$ in the label-print face of the optical disc 10. The control data DATc for outermost track circumference are treated as surface wobbling data of the outermost track circumferential portion 35$c$ in the label-print face of the optical disc 10. When such processing is repeated e.g. 800 times, the control data for feedforward control corresponding to one circumference of the disc can be obtained. FIG. 6 exemplifies values 32 of control data to the DAC 17 when the signal VEP becomes maximum, which result from the division of one circumference into 800, and values 33 of control data smoothed by an operation of the least squares method.

Figure 7:
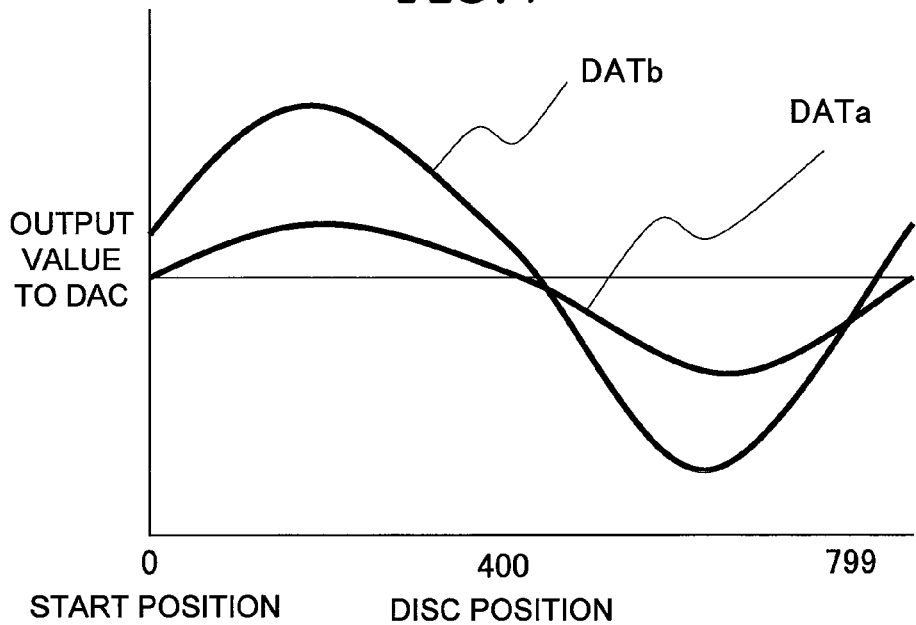
FIG. 7 is an explanatory drawing showing a situation where a value of control data DATa for the innermost track circumference and a value of control data DATb for the middle track circumference are plotted for each slot.

When laser label printing is performed actually, the MPU 12 controls the position of the objective lens 31 according to feedforward control using control data read out from the SDRAM 3. Specifically, the MPU 12 uses the innermost track circumference as an origin to move the pickup 5 in the radial direction of the optical disc 10 by e.g. 30 micrometers at a time. Then, on the destination circumference, the MPU 12 uses the control data for the position of each slot to control the position of the objective lens on the pickup, during which laser irradiation is performed and a label is printed sequentially. In this time, as to the innermost track circumference, middle track circumference and outermost track circumference, the corresponding control data DATa, DATb and DATc from the SDRAM 3 may be read out, and supplied to the DAC 17 by the MPU 12 and used as they are. For other circumferential portions, the MPU 12 reads out two pieces of control data for other positions from the SDRAM 3, and adjusts the focal point of the objective lens 31 according to the feedforward control using the control data derived by an interpolation operation with the control data thus read out. For instance, in label printing on a circumferential portion between the innermost track circumference and middle track circumference, the control data DATa for the innermost track circumference and the control data DATb for the middle track circumference are used. In FIG. 7, values of the control data DATa for the innermost track circumference and values of the control data DATb for the middle track circumference are plotted for every slot. For instance, assuming a print track interval of 30 micrometers, the difference between the positions of the innermost track circumference and the middle track circumference is 15 millimeters, which represents 500 print racks. The i-th control data $C_i$ starting to count from the disc-start position in the 100th print track from the innermost track circumference can be readily calculated from the i-th control data A from the disc-start position of the innermost track circumference and i-th data B from the disc-start position of the middle track circumference, by the following expression:

$C_i = A + 100*(B_i - A_i)/500$.

Even when there is no control data that can be directly supplied to the DAC 17 and used for feedforward control, the MPU 12 acquires control data for each print track by the interpolation operation and as such, the lack in accuracy never arises in focal point control and therefore there is no possibility that a stripe pattern of shades arises in the result of laser label printing. The inventor has found out that an optical disc 10 never has several undulations on a surface thereof between the innermost track circumference and the outermost track circumference basically. Therefore, when the arrangement as in this embodiment is used, data for laser label printing can be obtained with a high accuracy according to a simple interpolation process even if a small quantity of control data is used. The control data previously acquired and stored in the SDRAM 3 are data concerning track circumferences which are discontinuous and differ in position in the radial direction, e.g. the three circumferences of the innermost track circumference, the middle track circumference and the outermost track circumference. Hence, the processing time required for data acquisition can be extremely shortened in comparison to the case where control data for all track circumferences are acquired.

Next, the difference in focusing accuracy to be realized between feedback control and feedforward control will be described. When a surface wobbling of e.g. one millimeter is allowed for an optical disc such as a CD, the focusing accuracy required in recording on and reproducing from the optical disc is within ±1 micrometer. Hence, it is necessary that the objective lens be made to follow an information-recording track of an optical disc with its surface wobbling with an error within ±1 micrometer. In this case, the servo loop requires a loop gain of a factor of 1000, and not less than 60 dB. In general, a DAC having a sampling frequency of 50 kHz and an accuracy of 8 to 10 bits is used for this application. In short, as for a servo loop, the loop gain of a whole servo system is more important than the resolution of only the DAC.

On the other hand, it was found that to gain a good print quality without blurring and feathering and bleeding in laser label printing on a laser-label face of an optical disc having a surface wobbling, at the worst ±30 micrometers, and desirably ±20 micrometers should be achieved as the control accuracy of the position of the objective lens with respect to the position of the focal point on the optical disc. In the case of feed forward control, the focusing accuracy may be rougher than that in the case of feedback control certainly. However, in view of the nature of feedforward control, the degree of surface wobbling varies depending on the position. Further, it is necessary to prepare data for feedforward control for each position where the focusing actuator is driven. Moreover, accumulation of errors affects the control accuracy directly. Considering this fact, unlike feedback control, the operation resolution (the quantity of movement per LSB of the digital-to-analog conversion circuit) of the focusing actuator will have a direct influence on the focusing accuracy in the case of feedforward control. Hence, it was found that the operation resolution of the focusing actuator in feedback control is insufficient for feedforward control.

Figure 8:
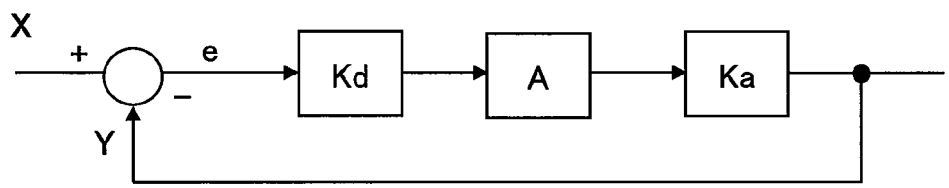
FIG. 8 is a block diagram of a servo loop in focus feedback control of the optical pickup.

For instance, FIG. 8 is a block diagram showing a servo loop in focus feedback control of the optical pickup. In the drawing, Kd denotes the sensitivity of the detector 23, A denotes the gain of the driver circuit 40, and Ka denotes the sensitivity of the lens actuator 30. Further, X denotes the quantity of surface wobbling of the disc 10 (up to ±500 micrometers), Y denotes the quantity of follow-up movement of the lens (in micrometers), e denotes an error (up to ±1 micrometer), Kd denotes the sensitivity of the detector 23 (volts/micrometer), A denotes the gain of the driver circuit 40, and Ka denotes the sensitivity of the focusing actuator 30

(volts/micrometer). As Y=Kd×A×Ka×e, and e=X/(1+Kd×A× Ka), the loop gain G of the servo loop is given by:

$$G = Kd \times A \times Ka.$$

In general, Kd takes a value of 0.1 to 0.2 volts (V)/micrometer (μm), and Ka is a value of 1 to 2 millimeter (mm)/V, approximately. When Kd=0.2 V/μm, and Ka=1 mm/V, if a thousand-fold or larger loop gain is required as described above, it is necessary that A=5 or larger because Kd×Ka=200. When Kd=0.1 V/μm, it is necessary that A=10 or larger. On this account, the gain of the motor driver amplifier 40 is set between six- and ten-fold normally. The DAC 17 is of about ten bits. As the output voltage range is about 2 volts, 1 LSB is about 2 mV, which is calculated by 2/1024. If the gain of the motor driver amplifier 40 is ten-fold, 2 mV×10=20 mV and Ka=1 mm/V, and therefore the operation resolution of the lens actuator 30 is 20 μm, which is a distance of move per 20 mV. In feedback control, a focusing accuracy of 1 μm can be realized because of the servo loop, the DAC 17 subjected to over sampling control (sampling output frequency is 300 to 500 kHz corresponding to a servo band of 10 kHz), and the fact that the accuracy can be gain by the time axis.

In contrast, in feedforward control associated with printing of a label face, the operation resolution of the focusing actuator 30 influences the focusing accuracy directly, and acquisition of control data through learning makes larger the accumulation of errors. Therefore, to control the focus error within ±20 micrometers, it is desired to make the operation resolution of the focusing actuator 30 about one-half to one-tenth that in the feedback control. If the gain of the driver circuit 40 is made twice one-fifth for this purpose, the resolution per LSB becomes 4 micrometers. Thus, the resolution can be made a satisfactory level from the viewpoint of feedforward control.

Figure 9:
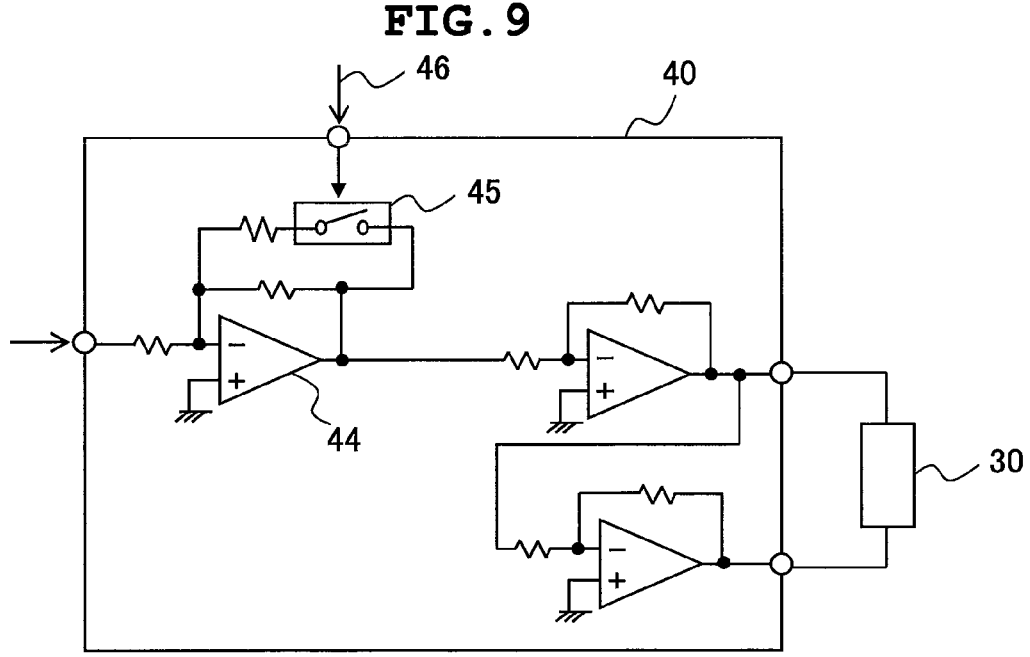
FIG. 9 is a circuit diagram exemplifying a driver circuit for the focusing actuator.

FIG. 9 shows a specific example of the driver circuit 40. The driver circuit is arranged so that the feedback resistance of the operational amplifier 44 can be switched by a switch 45. The switch 45 is brought to ON state according to a control signal 46 output by the MPU 12 in response to a label-print mode, otherwise it stays in OFF state. when the switch 45 is turned ON, the feedback resistance is made smaller, and the voltage gain is lowered. For instance, the gain is reduced to one-fifth.

Figure 10:
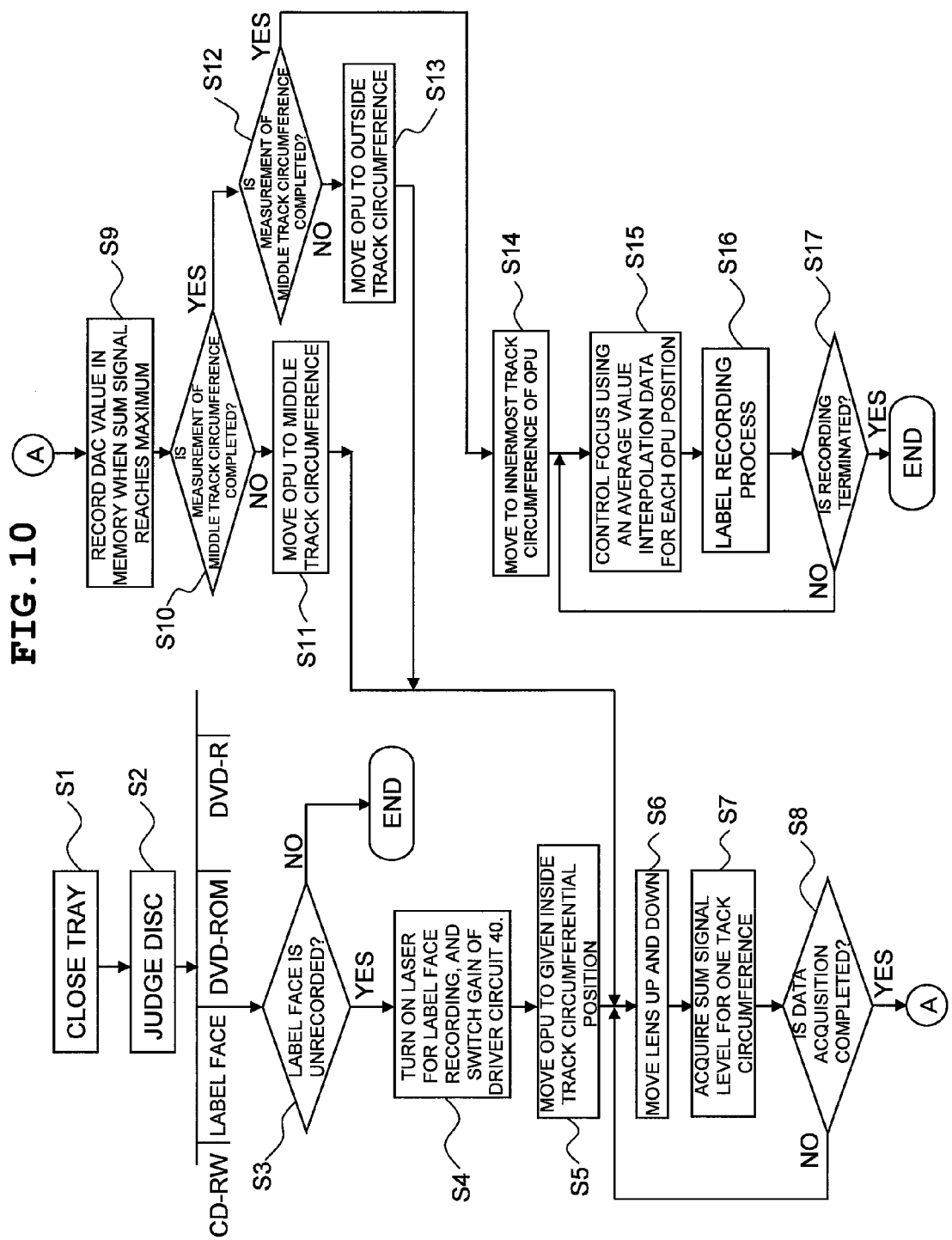
FIG. 10 is a flowchart showing a overall control procedure when focus control is executed by feedforward to perform label printing on an optical disc.

FIG. 10 shows a overall control procedure when focus control is executed by feedforward to perform label printing on an optical disc. When an optical disc is set on a tray, the tray is closed (S1). Then, a judgment about the optical disc is performed (S2). As a result, if the face of the disc exposed to laser light is judged to be a label-print face, which is also referred to as "label face" briefly, then it is judged whether or not no record is made on the label-print face (S3). When it is judged that a record has been made, the process is ended. When it is judged that no record has been made, a laser for recording on the label-print face is turned on, and concurrently the gain of the driver circuit 40 is made one-fifth by the control signal 46 (S4). For instance, when laser light of 780 nanometers for CD-ROMs and laser light of 640 nanometers for DVDs are used in the optical disc device designed for both CD-ROMs and DVDs, a laser of a wavelength of e.g. 780 nanometers that a laser-sensitive paint reacts well is turned on. Subsequently, the optical pickup (OPU) 5 is moved to a position of a given inside track circumference (S5). Then, the objective lens 31 is moved up and down (S6) while the signal EVP is acquired at positions corresponding individual slots constituting one turn of the track circumference (S7). After data acquisition is finished (S8), data to DAC when the signal EVP reaches the maximum are smoothed by the least squares method for each slot, the resultant data are stored in the SDRAM 3 as control data (S9). Here, the resultant data are stored in an area 3A of the SDRAM 3 as control data DATa. Next, a judgment is made about whether acquisition of data for a middle track circumference has been completed (S10). If the acquisition has not been completed, the optical pickup 5 is moved to the middle track circumference (S11) to execute Steps S6 to S9. Then, the data smoothed according to the least squares method are stored in an area 3B of the SDRAM 3 as control data DATb. When the acquisition of data for the middle track circumference has been completed, a judgment is made about whether acquisition of data for the outermost track circumference has been completed (S12). If the acquisition has not been completed, the optical pickup 5 is moved to the outermost track circumference (S13) to execute Steps S6 to S9. Then, the data smoothed according to the least squares method are stored in an area 3C of the SDRAM 3 as control data DATc. After the control data for the innermost track circumference, middle track circumference and outermost track circumference have been acquired, the optical pickup 5 is brought back to the innermost track circumference position (S14). Then, the pickup 5 is moved in the radial and circumferential directions sequentially using the start position as an origin. The focus control according to the feedforward is executed at each position using the control data thus stored or the control data acquired by the interpolation operation (S15), to perform a label-print process (a process of recording visible information on a label) (S16). Steps S15 and S16 are repeated until the termination of recording (S17).

Figure 11:
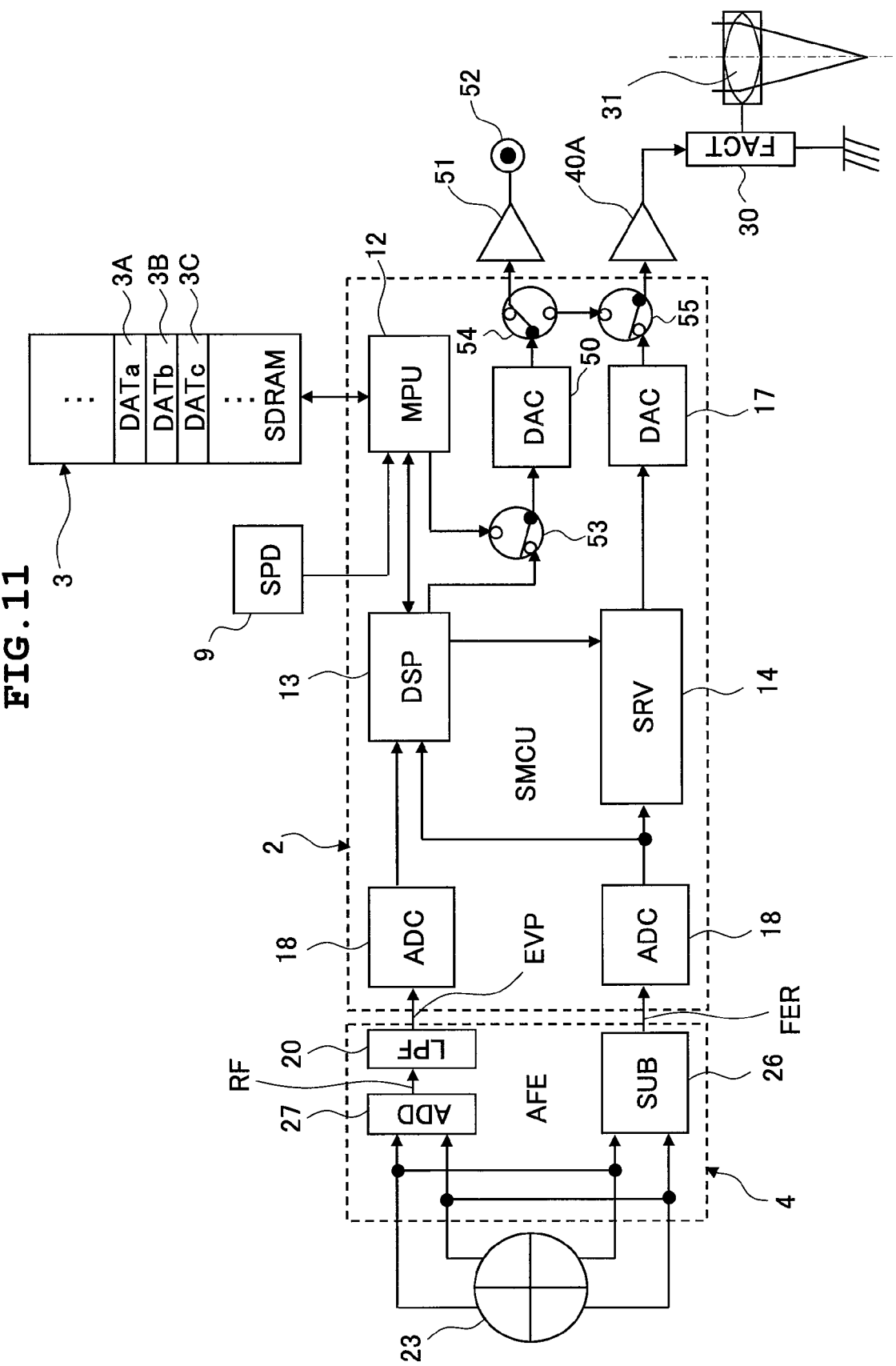
FIG. 11 is a block diagram exemplifying another control system of the focusing actuator in detail.

Another control system for the focusing actuator 30 will be exemplified in FIG. 11 in detail. An example that the operation resolution of the focusing actuator 30 can be selected by switching between the DACs 17 and 50 in the focus control for the focus servo according to feedback with respect to an information-recording track of an optical disc, and the focus control for laser label printing according to feedforward will be described here in detail.

The audio analog-to-digital conversion circuit (DAC) 50 is herein used to convert control data for label printing output by the MPU 12 into analog signals, instead of the analog-to-digital conversion circuit (DAC) 17 for servo control, which is intended to convert control data for servo control into analog signals. The conversion bit number of the audio analog-to-digital conversion circuit 50 is larger than that of the analog-to-digital conversion circuit 17 for servo control. The reference numeral 51 denotes an audio driver circuit, whose output is connected to an external earphone terminal 52. The reference numerals 53 to 55 each denote a selector.

In recording and reproducing of an information-recording track of an optical disc 10, the selector 53 connects an input of the audio DAC 50 with an output of the DSP 13. The selector 54 connects an output of the audio DAC 50 with an input of the audio driver circuit 51. The selector 55 connects an output of the DAC 17 for focus control with an input of the driver circuit 40A for servo control.

In contrast, when laser label printing is performed on the optical disc, the selector 532 connects the output of the MPU 12 to the input of the audio DAC 50. The selector 54 selects a path toward the selector 55, to connect the output of the audio DAC 50 to the path. The selector 55 connects the path to the input of the driver circuit 40A for focus control. The driver circuit 40A for servo control does not have the feedback path extending through the switch 45 in the driver circuit 40 as shown in FIG. 9, and its gain is the same as the gain of the driver circuit 40 when the switch 45 is in its OFF state as shown in FIG. 9. The gain of the driver circuit 40A is restricted depending on the relation with the loop gain for servo control. The number of bits of the DAC 50 is larger than that of the DAC 17, which is e.g. 16 bits. The operation resolution of the focusing actuator 30 in the time of laser label printing is higher than that in the case of using the DAC 17. Thus, the effective bit number of focus control data in the time of laser label printing is made 13 bits approximately, and accordingly use of the thirteen highmost bits of the DAC 50 allows the resolution per LSB of the focusing actuator 30 to be made 4 micrometers or smaller. Consequently, it becomes possible to control the focus error substantially within ±20 micrometers.

According to the arrangement as shown in FIG. 11, the number of switches and the number of bits of focus control data for label printing are increased in comparison to that shown in FIG. 1. An increase in bit number of the focus control data leads to the increase in quantity of data, learning time and print time. In this respect, use of the means for performing learning for surface wobbling data on inside, middle and outside track circumferences to complement data as described above in parallel can relieve the increase in quantity of data and learning time.

As for the focusing accuracy of label printing as described above, it cannot be said that the higher the accuracy is, the better it is, as long as it is within ±30 micrometers. In the above description, ±20 micrometers is taken as one example. However, as a result of the examination, the inventor has reached the conclusion that an appropriate focusing accuracy is within ±10 micrometers. As the accuracy is made higher, it is required to increase the bit number of data for focus control according to feedforward. In addition, it is considered that label printing on a whole laser-label face such that it takes several tens of minutes even after learning of surface wobbling data cannot be fit for practical use. A label-print face is rough originally, and there is a limit to the materialization of high image quality. Therefore, even if label printing is performed with a high accuracy surmounting such limit, it is meaningless. In consideration of these facts, the inventor has reached the above-described conclusion that the focusing accuracy in label printing is between ±30 to ±10 micrometers.

Although the invention, which was made by the inventor, has been specifically described above based on the embodiments thereof, the invention is not limited to the embodiments. It is needless to say that various changes and modifications may be made without departing from the subject matters hereof. The optical disc device is not limited to the use of PCs (personal computers), it may be intended for uses of music and image.

INDUSTRIAL APPLICABILITY

The invention can be applied widely to optical disc drives on the periphery of PCs such as CD-R, DVD-R and DVD-RAM, and further to DVD recorders dedicated to music and video images, etc.

What is claimed is:

1. An optical disc device which can record and reproduce information by irradiating a face of an optical disc with laser light from an objective lens and perform label printing by irradiating the other face of the optical disc with the laser light from the objective lens, comprising:
a circuit for forming a focus error signal for a focus servo based on a reflection light from the optical disc exposed to the laser light; and
a data processing unit which can feedback-control a position to which the objective lens is moved by a focusing actuator, based on the focus error signal,
wherein when performing the label printing, the data processing unit feedforward-controls a position to which the objective lens is moved by the focusing actuator based on control data for the label printing,
an operation resolution of the focusing actuator in the feedforward control is made higher in comparison to an operation resolution of the focusing actuator in the feedback control,
in the feedback control, a control accuracy of a position of the objective lens with respect to a position of a focal point on the optical disc is ±1 micrometer or smaller, and
in the feedforward control, a control accuracy of a position of the objective lens with respect to a position of a focal point on the optical disc is between ±10 and ±30 micrometers.

2. The optical disc device of claim 1, wherein the data processing unit has: an analog-to-digital conversion circuit which converts the focus error signal into digital data; a servo control circuit which an output of the analog-to-digital conversion circuit is input to and which produces servo control data; and a digital-to-analog conversion circuit which converts the servo control data output by the servo control circuit or the control data for label printing into analog signals, the optical disc device further comprising a driver circuit which amplifies an output of the digital-to-analog conversion circuit and supplies the resultant signals to the focusing actuator,
wherein the driver circuit is arranged so that its gain can be switched, and
the gain is switched and controlled so that the gain used in the feedforward control becomes smaller than the gain used in the feedback control.

3. The optical disc device of claim 2, wherein the driver circuit is arranged so that its voltage gain can be switched.

4. The optical disc device of claim 1, wherein the data processing unit has: an analog-to-digital conversion circuit which converts the focus error signal into digital data; a servo control circuit which an output of the analog-to-digital conversion circuit is input to, and which produces servo control data; a digital-to-analog conversion circuit for servo which converts servo control data output by the servo control circuit into analog signals; a digital signal processing circuit which reproduces record information read out from an optical disc; and an audio digital-to-analog conversion circuit which converts audio information reproduced by the digital signal processing circuit or the control data for label printing into analog signals, the optical disc device further comprising
a focusing driver circuit which amplifies an output of the digital-to-analog conversion circuit for servo or an output of the audio digital-to-analog conversion circuit and supplies the resultant to the focusing actuator, and
an audio driver circuit which amplifies an output of the audio digital-to-analog conversion circuit and outputs the resultant outside,
wherein an input of the focusing driver circuit is connected with an output of the digital-to-analog conversion circuit for servo when the feedback control is used to control a position to which the objective lens is moved by the focusing actuator, and
an input of the focusing driver circuit is connected with an output of the audio digital-to-analog conversion circuit, and the control data for label printing is supplied to an input of the audio digital-to-analog conversion circuit when the feedforward control is used to control the position to which the objective lens is moved by the focusing actuator.

5. An optical disc device which can record and reproduce information by irradiating a face of an optical disc with laser light from an objective lens and perform label printing by irradiating the other face of the optical disc with the laser light from the objective lens, comprising:
- a circuit for forming a focus error signal for a focus servo based on a reflection light from the optical disc exposed to the laser light; and
- a data processing unit which can feedback-control a position to which the objective lens is moved by a focusing actuator, based on the focus error signal,
- wherein when performing the label printing, the data processing unit feedforward-controls a position to which the objective lens is moved by the focusing actuator based on control data for the label printing, and
- when performing the feedforward control, the data processing unit switches and controls a gain of a driver circuit of the focusing actuator so as to become smaller than the gain in the feedback control.

6. The optical disc device of claim 5, wherein the data processing unit performs a learning process which includes previously acquiring and storing, in a memory, the control data for label printing for determining a position of the objective lens in a focal point direction so that a quantity of reflection light reflected off the other face of the optical disc becomes maximum while moving a laser irradiation position in circumferential and radial directions of the optical disc, and uses the control data read out from the memory in the feedforward control.

* * * * *